UNITED STATES PATENT OFFICE.

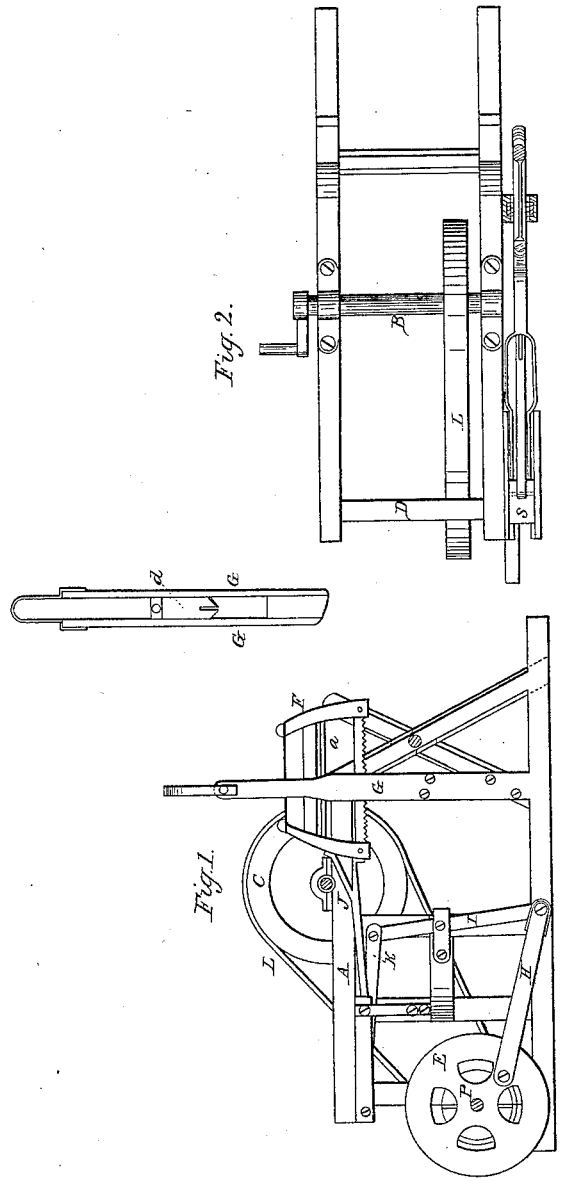

WILLIAM T. MILLS, OF KALAMAZOO, MICHIGAN.

SAWING-MACHINE.

Specification of Letters Patent No. 32,839, dated July 16, 1861.

*To all whom it may concern:*

Be it known that I, WM. T. MILLS, of Kalamazoo, State of Michigan, have invented certain new and useful Improvements in Machines for Sawing Wood; and I do hereby declare that the following is a full, clear, and exact description of the same, reference being had to the accompanying drawings and to the letters of reference marked thereon.

The nature of my invention consists in constructing and arranging the several parts of this machine in the manner herein set forth.

In the annexed drawings making part of this specification A represents a frame in which the machinery is secured, which is constructed in a strong and substantial manner. A saw buck is formed at one end of the frame as shown in the figure. Across the frame lies a shaft B, upon which is secured a drum C. A band L passes around this drum and around a drum secured upon a shaft P, which has its bearing in the frame A. Upon the shaft P is secured a driving wheel E, and a pitman H conveys motion from this driving wheel to a lever I, as is clearly shown in the figure.

S, represents a slide which is supported upon horizontal ways secured to the frame, and K, is a connecting rod which connects the lever I, to the said slide.

J, is a pitman which connects the slide S, to the saw F.

G, G, represent two guides which stand vertically connected to the frame, and between which is secured a guide block $d$. The block $d$ slides in grooves in the guides G, G.

The saw F, is provided with a metallic rod $a$, which passes through a hole in the guide block $d$, and works backward and forward in it when the saw is in motion. The saw it will be seen works between the guides G, G, and is held in place by the guide block $d$ and rod $a$. As the saw cuts into the timber upon the buck the block $d$, slides down and keeps the saw pressed down to its work. By turning the crank on the end of shaft B motion is given to the saw through the pulley C, band L, driving wheel E, pitmen J and H lever I and connecting rod K.

Having thus fully described my invention what I claim as new and desire to secure by Letters Patent is—

The combination of the saw F the rod $a$, the guide block $d$, the grooved supports G, G, the pitmen H and J, lever I, and connecting bar K when arranged with the frame as constructed, for joint operation in the manner and for the purpose specified.

WILLIAM T. MILLS.

Witnesses:
JOHN DEN BLEYKER,
E. T. MILLS.